Patented Feb. 23, 1932

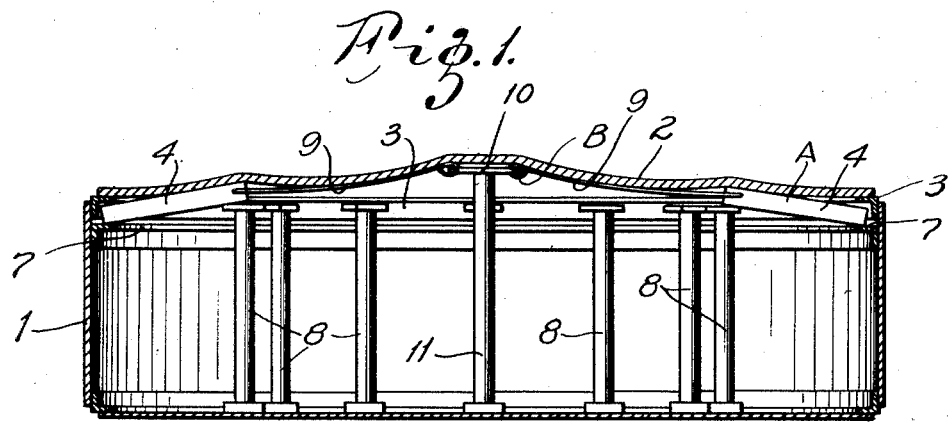
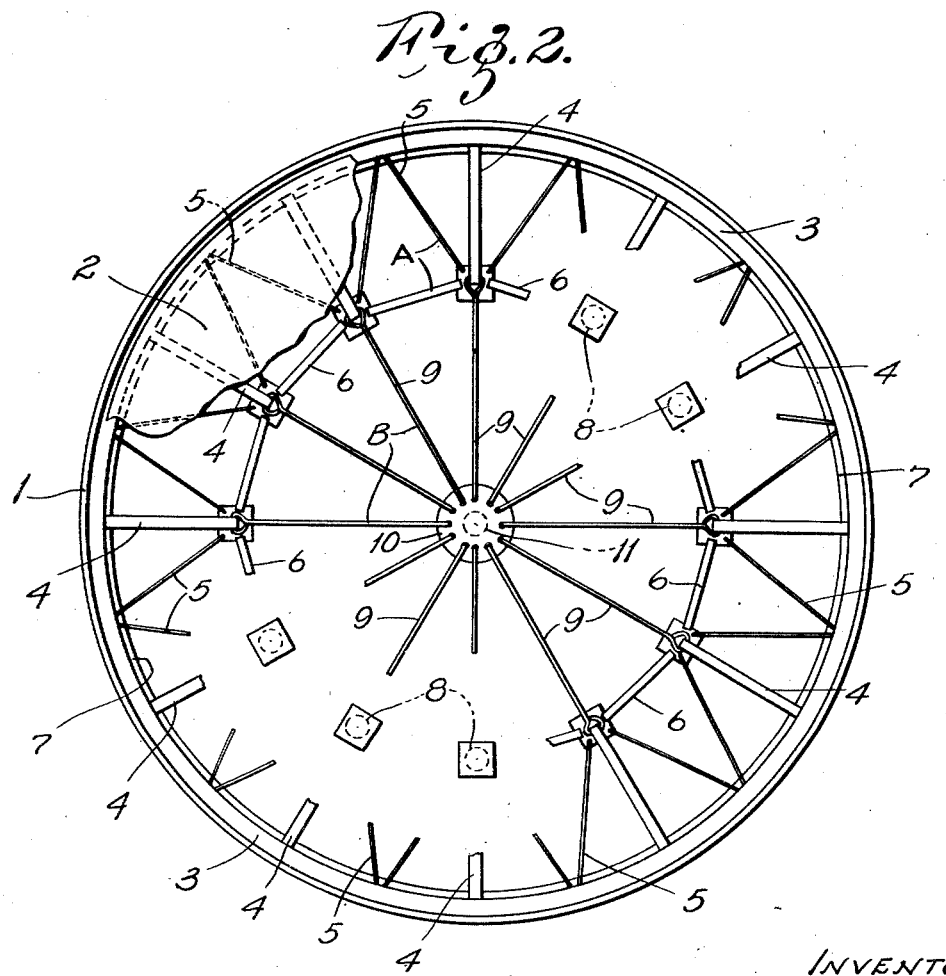

1,846,294

UNITED STATES PATENT OFFICE

JOHN H. WIGGINS, OF TULSA, OKLAHOMA

ROOF SUPPORT FOR STORAGE TANKS

Application filed February 15, 1928. Serial No. 254,518.

This invention relates to large metal tanks of the kind that are used in the oil fields for storing oil, and particularly to tanks of the type in which a stationary supporting structure is arranged inside of the tank, so as to sustain or carry the roof of the tank.

Storage tanks of the kind mentioned often have a diameter in excess of 100 ft., and it is now the usual practice to form the supporting structure for the roofs of such tanks from commercially rolled shapes or tubular members combined with uprights in such a way as to form a rigid support extending across the entire diameter of the tank whose component parts or elements are maintained under compression by the load imposed on same by the roof.

The main object of my invention is to reduce the cost of a tank roof supporting structure of the general type mentioned.

Another object is to provide a tank roof support that is capable of sustaining as great a load as the conventional tank roof supporting structure, but which comprises fewer heavy, rigid roof rafters and fewer uprights or posts resting on the bottom of the tank. Other objects and desirable features of my invention will be hereinafter pointed out.

To this end I have devised a roof support for large oil tanks that comprises two separate and distinct portions, to wit, a rigid structure inside of the tank that extends around the side wall of the tank and serves as a bearing on which the peripheral portion of the roof rests, and a catenary or suspension support carried by or suspended from said rigid structure and adapted to serve as a bearing for the balance of the roof. Said rigid structure is of substantially circular shape in outline or form and it co-acts with the side wall of the tank in such a way as to serve as a compression element for the top edge of the side wall that holds said side wall in shape. It can be constructed in various ways without departing from the spirit of my invention, but will usually be made up of radially-disposed roof rafters that extend inwardly from the side wall of the tank, and struts arranged between the inner ends of said roof rafters and extending in the same general direction as the side wall of the tank, thus forming a skeleton-like framework of substantially annular form that extends unbrokenly around the top edge of the side wall of the tank. The outer edge of this circular-shaped framework is supported or sustained by the side wall of the tank, and the inner edge of said framework is supported by posts or uprights that rest upon the bottom of the tank.

The catenary or suspension support on which the central portion of the roof rests, is made up of tension members attached to the rigid circular structure on which the peripheral portion of the roof rests. In the form of my invention herein illustrated said tension members extend radially from a central post or upright at the center of the tank, and the outer ends of said tension members are attached to the inner edge of the rigid circular structure previously referred to.

My improved roof support is adapted for use with tanks of the type in which the roof is composed of a rigid, horizontally-disposed diaphragm that covers the entire area of the tank, and also tanks of the type in which the roof or a portion of the roof is constructed in the form of a diaphragm that is capable of flexing upwardly and downwardly so as to vary the volume of the vapor space of the tank, as described in my prior U. S. Patent No. 1,645,313, dated October 11, 1927. The circular structure that serves as a support for the peripheral portion of the roof can vary in depth and can be constructed in various ways, but it is preferable to use a circular structure whose depth is great enough to be economical as a supporting structure and small enough so that too much steel is not wasted to give sufficient strength to same. The suspension support that is used to sustain the central portion of the roof can also be constructed in various ways and can be combined with the circular structure in various ways, without departing from the spirit of my invention, but said suspension support is preferably constructed from rods or from cables which either extend across the space surrounded by the circular structure, or which extend from the inner edge of said circular structure to an upright or uprights arranged at the center of the tank or at points intermediate the center and the circular structure.

Figure 1 of the drawings is a vertical transverse sectional view of a large oil storage tank equipped with a roof support constructed in accordance with my invention; and Figure 2 is a top plan view of the tank illustrated in Figure 1, with the major portion of the roof removed so as to more clearly illustrate the construction of the roof support.

In the accompanying drawings which illustrate one form of my invention, 1 designates the side wall of the tank, and 2 designates the roof of the tank which is formed from metal plates connected together in such a way as to form an imperforate closure for the upper end of the tank that covers the entire area of the tank. In the tank herein illustrated the peripheral edge of the roof 2 is rigidly connected by means of an angle 3, or in any other suitable manner to the side wall of the tank, but I wish it to be understood that my invention is applicable to other types and kinds of tank roofs.

The tank is equipped with a roof support which is herein illustrated as comprising an outer portion A of substantially annular form or circular shape in general outline, arranged inside of the tank at the top edge of the side wall of same, and a portion B suspended from said circular-shaped outer portion A. In a tank roof of the rigid type the peripheral portion of the roof will always rest upon and be supported by the circular-shaped outer portion A of the roof support, and the central portion of the roof will rest upon and be supported by the suspension portion B of the roof support, but in a tank roof of the kind that is capable of flexing upwardly and downwardly so as to vary the volume of the vapor space of the tank there will be times when the roof is flexed upwardly off of the portions A and B of the roof support.

One convenient way of constructing my improved roof support is to build the outer portion A of same from radially-disposed roof rafters 4 that extend inwardly from the side wall 1 of the tank adjacent the top edge of said side wall, struts 6 arranged between the inner ends of the roof rafters 4 and extending in the same general direction as the side wall of the tank, and pairs of oppositely-inclined braces 5 arranged between the roof rafters and projecting inwardly from the side wall of the tank, as shown in Figure 2. Usually, the side wall 1 of the tank will be provided with an inwardly-projecting flange or angle 7 on which the outer ends of the roof rafters 4 and inclined braces 5 rest, but if desired, brackets may be attached to the inner face of the side wall of the tank to carry these parts of the circular portion of the roof support. As previously stated, the inner edge of the circular portion of the roof support is sustained by posts or uprights 8 that project upwardly from the bottom of the tank, and which are provided at their upper ends with cap pieces that serve as bearing members for the inner ends of the roof rafters 4, for the ends of the struts 6 and for the inner ends of the inclined braces 5, said parts being connected together in such a way that they co-act to form in effect a ring-shaped structure that has sufficient rigidity to hold the top edge of the side wall of the tank in shape and which is sustained by the side wall of the tank and by the posts 8.

The portion B of my improved roof support is herein illustrated as being composed of rods or cables 9 connected at their outer ends to some part of the circular framework that constitutes the outer portion A of the roof support, for example, to the inner ends of the roof rafters 4, and the inner ends of said rods or cables 9 are attached to a cap piece 10 on a center post or upright 11 that rests on the bottom of the tank.

It is not essential that the suspension support B comprise a center post or upright, but in large tanks it is preferable to combine either one or a plurality of uprights 11 with the members 9 so as to prevent said members from sagging or deflecting too much. In view of the fact that the members 9 are maintained in tension by the load which they sustain, I will refer to said members as tension members.

A roof support of the construction above described can be built at a relatively low cost, due to the fact that the rods or cables used to form the tension members 9 are cheaper and lighter in weight than commercially rolled members or tubular members, and still another desirable feature of such a roof support is that fewer posts or uprights are required to sustain or carry the parts of the structure on which the roof rests. Notwithstanding the fact that said roof support comprises fewer posts resting on the bottom of the tank and fewer roof rafters than supporting structures of the kind heretofore used extensively for supporting tank roofs, it is strong enough to successfully carry the load of a tank roof of great diameter, due to the fact that the central portion of the roof is sustained by a suspension support whose radial stresses are carried by a rigidly supported framework of substantially annular shape or form that serve as a compression element for the top edge of the side wall of the tank.

I have herein illustrated the circular structure of the roof support as comprising roof rafters or members that slope upwardly from the side wall of the tank, but it will be obvious that said roof rafters may either be arranged level or with their inner ends inclinded downwardly.

Having thus described my invention, what I claim as new and desire to secure by Letters Patent is:

A roof support for storage tanks, comprising roof rafters sustained at their outer ends by the side wall of the tank and projecting inwardly from said side wall, struts combined with said roof rafters so as to co-operate with same to form a framework extending around the top edge of the side wall of the tank and adapted to serve as a bearing for the peripheral portion of the roof, uprights on the bottom of the tank that assists in carrying the load imposed on said framework, a center post in the tank, and tension members extending radially from said center post to said framework so as to form a bearing for the central portion of the roof.

JOHN H. WIGGINS.